United States Patent
Raether

(10) Patent No.: US 8,349,044 B2
(45) Date of Patent: *Jan. 8, 2013

(54) FILTER APPARATUS WITH PULSE CLEANING AND METHODS FOR PULSE CLEANING FILTERS

(75) Inventor: Thomas D. Raether, St. Louis Park, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/288,661

(22) Filed: Nov. 3, 2011

(65) Prior Publication Data

US 2012/0048116 A1  Mar. 1, 2012

Related U.S. Application Data

(63) Continuation of application No. 11/946,934, filed on Nov. 29, 2007, now Pat. No. 8,075,674.

(60) Provisional application No. 60/867,843, filed on Nov. 30, 2006.

(51) Int. Cl.
*B01D 46/04* (2006.01)
(52) U.S. Cl. ............................. 55/302; 95/280
(58) Field of Classification Search ............ 95/278–280; 55/302–303, 490, 492, 495–511
See application file for complete search history.

(56) References Cited

U.S. PATENT DOCUMENTS

| | | |
|---|---|---|
| 2,591,198 A | 4/1952 | Ringe |
| 2,748,948 A | 6/1956 | Fricke et al. |
| 2,836,257 A | 5/1958 | Muller |
| 3,095,290 A | 6/1963 | Hockett |
| 3,173,777 A | 3/1965 | Tamny |
| 3,234,714 A | 2/1966 | Rymer et al. |
| 3,325,978 A | 6/1967 | Rymer et al. |

(Continued)

FOREIGN PATENT DOCUMENTS

DE   1 228 130   11/1966

(Continued)

OTHER PUBLICATIONS

Partial International Search Report, mailed Jun. 3, 2008.

*Primary Examiner* — Duane Smith
*Assistant Examiner* — Thomas McKenzie
(74) *Attorney, Agent, or Firm* — Merchant & Gould P.C.

(57) ABSTRACT

A method of pulse cleaning filter media in panel, cylindrical, conical, or V-pack style filter in an opening of a tubesheet is provided. The method includes directing a fluid pulse at the filter media at an angle that is: (i) not normal to a plane of the opening of the tubesheet; and (ii) not in line with the general direction of the filtration flow through the filter media. An air cleaner is provided including a housing including a dirty air inlet, a clean air outlet, and an interior. A tubesheet is in the housing interior having a plurality of openings. In the plurality of openings of the tubesheet are mounted filters with filter media. There is a plurality of blow pipes, with each blow pipe being pointed to direct at a fluid pulse a respective one of the filters at an angle that is: (i) not normal to a plane of the opening in the tubesheet; and (ii) not in line with the general direction of filtration flow through the respective filter media.

10 Claims, 8 Drawing Sheets

U.S. PATENT DOCUMENTS

| | | | |
|---|---|---|---|
| 3,394,532 A | 7/1968 | Oetiker | |
| 3,402,881 A | 9/1968 | Moore et al. | |
| 3,487,609 A | 1/1970 | Caplan | |
| 3,499,268 A | 3/1970 | Pausch | |
| 3,508,383 A | 4/1970 | Humbert, Jr. et al. | |
| 3,509,698 A | 5/1970 | Medcalf et al. | |
| 3,535,852 A | 10/1970 | Hirs | |
| 3,692,184 A | 9/1972 | Miller, Jr. et al. | |
| 3,726,066 A | 4/1973 | Colley et al. | |
| 3,732,669 A | 5/1973 | Chambers | |
| 3,735,566 A | 5/1973 | Laliwala | |
| 3,757,497 A | 9/1973 | Ray | |
| 3,807,150 A | 4/1974 | Maracle | |
| 3,831,354 A | 8/1974 | Bakke | |
| 3,853,509 A | 12/1974 | Leliaert | |
| 3,874,857 A | 4/1975 | Hunt et al. | |
| 3,883,331 A | 5/1975 | Bernard et al. | |
| 3,942,962 A | 3/1976 | Duyckinck | |
| 4,171,963 A | 10/1979 | Schuler | |
| 4,218,227 A | 8/1980 | Frey | |
| 4,227,903 A | 10/1980 | Gustavsson et al. | |
| 4,251,244 A | 2/1981 | Evenstad | |
| 4,272,262 A | 6/1981 | Britt et al. | |
| 4,277,260 A | 7/1981 | Browning | |
| 4,278,454 A | 7/1981 | Nemesi | |
| 4,292,057 A | 9/1981 | Ulvestad et al. | |
| 4,306,893 A | 12/1981 | Fernando et al. | |
| 4,359,330 A * | 11/1982 | Copley | 96/426 |
| 4,395,269 A | 7/1983 | Schuler | |
| 4,504,288 A | 3/1985 | Kreft | |
| 4,504,293 A | 3/1985 | Gillingham | |
| 4,560,396 A * | 12/1985 | O'Dell | 55/287 |
| 4,578,092 A | 3/1986 | Klimczak | |
| 4,632,680 A | 12/1986 | Klimczak | |
| 4,661,131 A | 4/1987 | Howeth | |
| 4,820,320 A | 4/1989 | Cox | |
| 4,909,813 A | 3/1990 | Eggerstedt | |
| 4,955,996 A | 9/1990 | Edwards et al. | |
| 5,002,594 A | 3/1991 | Merritt | |
| 5,062,867 A | 11/1991 | Klimczak | |
| 5,062,872 A | 11/1991 | Williams | |
| 5,062,873 A | 11/1991 | Karlsson | |
| 5,156,660 A | 10/1992 | Wilson | |
| 5,393,327 A | 2/1995 | Chambers et al. | |
| 5,421,845 A | 6/1995 | Gregg et al. | |
| 5,562,746 A | 10/1996 | Raether | |
| 5,944,859 A | 8/1999 | Lippert et al. | |
| 5,980,598 A | 11/1999 | Horvat | |
| 6,090,173 A | 7/2000 | Johnson et al. | |
| 6,123,751 A | 9/2000 | Nelson et al. | |
| 6,322,618 B1 | 11/2001 | Simms et al. | |
| 6,716,274 B2 * | 4/2004 | Gogins et al. | 95/273 |
| 6,723,145 B2 * | 4/2004 | Cole | 55/342 |
| 6,875,256 B2 * | 4/2005 | Gillingham et al. | 95/273 |
| 6,908,494 B2 | 6/2005 | Gillingham et al. | |
| 6,974,490 B2 * | 12/2005 | Gillingham et al. | 55/486 |
| 7,282,075 B2 * | 10/2007 | Sporre et al. | 55/302 |
| 7,828,075 B2 | 11/2010 | Daniel et al. | |
| 2002/0059868 A1 | 5/2002 | Gogins et al. | |
| 2003/0037675 A1 | 2/2003 | Gillingham et al. | |
| 2004/0118283 A1 | 6/2004 | Hering | |
| 2004/0221721 A1 | 11/2004 | Prill | |
| 2005/0120881 A1 | 6/2005 | Sporre et al. | |
| 2008/0127827 A1 | 6/2008 | Raether | |
| 2008/0127828 A1 | 6/2008 | Raether | |

FOREIGN PATENT DOCUMENTS

| | | |
|---|---|---|
| DE | 1 407 933 | 4/1972 |
| DE | 39 05 113 A1 | 8/1990 |
| EP | 0 123 721 A1 | 9/1983 |
| EP | 0 338 314 A1 | 10/1989 |
| EP | 1 358 922 A1 | 11/2003 |
| FR | 1 184 609 | 7/1959 |
| FR | 1 413 752 | 11/1964 |
| FR | 1 590 764 | 4/1970 |
| FR | 2 401 690 | 3/1979 |
| FR | 2 709 978 | 3/1995 |
| GB | 326 047 | 3/1930 |
| GB | 662.358 | 12/1951 |
| GB | 781 194 | 8/1957 |
| GB | 838 523 | 6/1960 |
| GB | 880 043 | 10/1961 |
| GB | 914 187 | 12/1962 |
| GB | 939 641 | 10/1963 |
| GB | 948 705 | 2/1964 |
| GB | 1016556 | 1/1966 |
| GB | 1113154 | 5/1968 |
| GB | 1 220 174 | 1/1971 |
| GB | 1 345 977 | 2/1974 |
| SU | 627841 | 10/1978 |

* cited by examiner

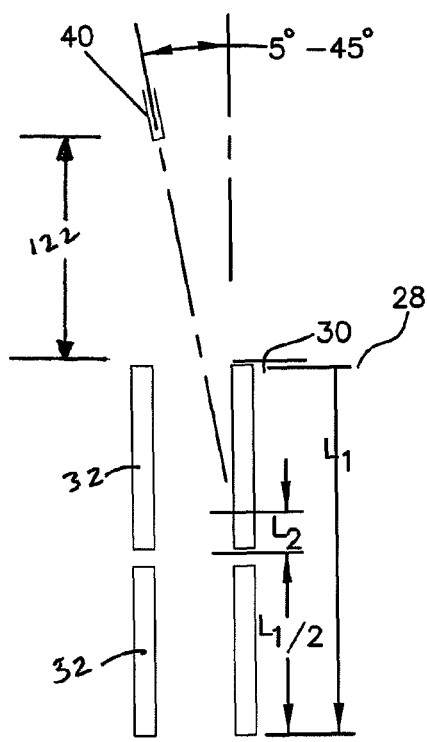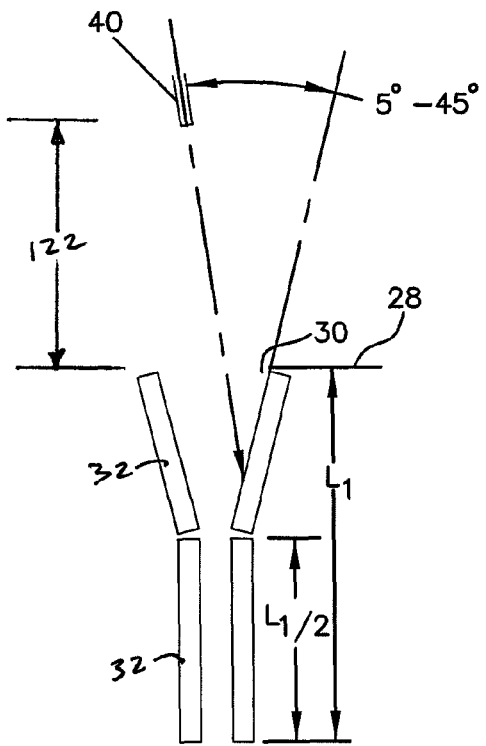

FILTER APPARATUS WITH PULSE CLEANING AND METHODS FOR PULSE CLEANING FILTERS

CROSS REFERENCE TO RELATED APPLICATIONS

This application is a continuation of application Ser. No. 11/946,934, filed Nov. 29, 2007, which application claims the benefit of provisional application Ser. No. 60/867,843, filed Nov. 30, 2006, which applications are incorporated herein by reference in their entirety.

TECHNICAL FIELD

This disclosure relates to methods for pulse cleaning filter elements utilizing pressurized gas generators. This disclosure also relates to apparatus including air cleaners, dust filters, and pulse cleaning technology.

BACKGROUND

Air cleaners or dust collector devices sometimes use exhaust gas from a valve and pressure tank (reservoir) to back flush filters. Examples of such air filters assemblies are disclosed in, for example, U.S. Pat. Nos. 6,090,173; 4,218,227; 4,395,269; 5,980,598; 6,322,618; DE 3905113; and Patent Publication U.S. 2006/0112667A1, each of these patent documents being incorporated by reference herein.

Effective cleaning of these filters requires that the exhaust jet fill the opening of the filter to be cleaned. In many implementations, the opening of the filter corresponds to the opening in the tubesheet, in which the filter is mounted. Improvements in pulse cleaning filters are desirable.

SUMMARY

A method of pulse cleaning filter media in a panel, cylindrical, conical or V-pack style filter, mounted in an opening of a tubesheet is provided. The method includes directing a fluid pulse at the filter media at an angle that is: (i) not normal to a plane of the opening of the tubesheet; and (ii) not in-line with the general direction of the filtration flow through the media.

As used throughout this specification, "normal" means 90°±5°, and "in-line", it is meant 0°±5°.

An air cleaner is provided including a housing including a dirty air inlet, a clean air outlet, and an interior. A tubesheet is in the housing interior having a plurality of openings. In the plurality of openings of the tubesheet are mounted filter media in the form of panel-style, cylindrical, conical, or v-pack filters. There is a plurality of blow pipes, with each blow pipe being pointed to direct a fluid pulse at a respective one of the openings in the tubesheet holding one of the filters. The pulse is directed at an angle that is: (i) not normal to a plane of the opening in the tubesheet; and (ii) not in line with the general direction of filtration flow through the respective panel-style filter.

BRIEF DESCRIPTION OF THE DRAWINGS

FIG. 7A is a schematic diagram illustrating principles of this disclosure on multiple cylindrical filters;

FIG. 7B is a schematic diagram illustrating principles of this disclosure on combination conical/cylindrical filters.

DETAILED DESCRIPTION

Figure 1:
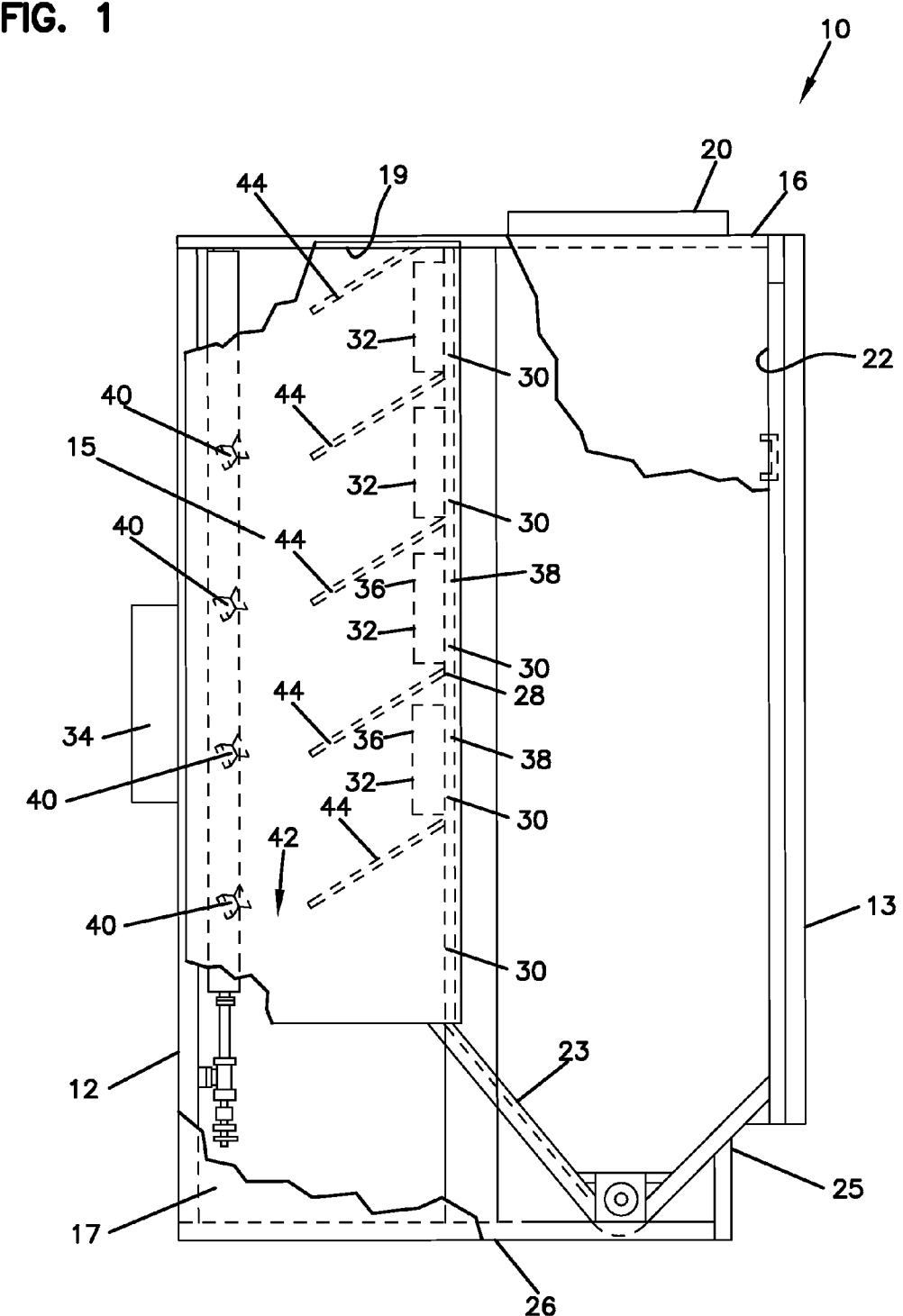
FIG. 1 is a side elevational view, partially broken away, of one embodiment of an air filter system utilizing principles of this disclosure.

A dust filter or air cleaner system is depicted generally at 10 in FIG. 1. The system depicted includes a housing 12 having a side wall panel 17 broken away to illustrate the arrangement of various portions of the assembly. An upper wall panel 16 has an inner wall surface 19. In this embodiment, an air inlet 20 is positioned in the upper wall panel 16 so that the particulate-laden air or other fluid is introduced into an unfiltered (dirty) fluid chamber 22. The unfiltered chamber 22 is defined by an access door 13, the upper wall panel 16, opposing side wall panels 17, a tubesheet 28, and a bottom surface 23 partially defining a collection area or hopper 25. The bottom base panel or frame 26 is secured to the side wall panels 17 in a suitable manner.

As mentioned above, the tubesheet 28 is mounted in the interior of the housing 12. The tubesheet 28 includes a plurality of openings 30. Within each opening 30 is mounted one or more filter elements, which in the illustrated embodiment, is a panel-style filter element 32. By the term "panel-style filter element" it is meant an element with filter media in which, in general, fluid to the filtered flows through the filter element in a straight-flow thorough manner. For example, a panel-style filter element can be pleated media, depth media, fluted media, Z-media, or mini V-packs. By "Z-media", it is meant media having first and second opposite flow faces with a plurality of flutes, each of the flutes having an upstream portion adjacent to the first flow face and a downstream portion adjacent to second flow face, selected ones at the flutes being open at the upstream portion and closed at the downstream portion, while selected ones of the flutes are closed at the upstream portion and open at the downstream portion. The flutes can be straight, tapered, or darted. Examples of filter elements with Z-media are found in, for example, U.S. Pat. No. 5,820,646; Patent Publication 2003/0121845; and U.S. Pat. No. 6,350,291, each of these patent documents being incorporated by reference herein.

In operation, fluid, such as air, to be filtered flows into the system 10 through the inlet 20. From there, it flows through the filter elements 32. The filter elements 32 remove particulate material from the fluid. The filtered fluid then flows into the clean air or filtered flow chamber 15. From there, the clean air flows through an outlet 34. Periodically, the filter elements 32 will be cleaned by pulsing a fluid jet, such as a jet of air, from a downstream side 36 of the filter element 32 to an upstream side 38 of the filter element 32. Specifically, a jet of pressurized gas will be directed through individual blow pipes 40, a respective blow pipe being oriented for each of the respective filter elements 32. This will direct the jet through each filter element 32, from the downstream side 36 to the upstream side 38. This helps to knock debris and particulate from the upstream side 38 of the filter element 32, directing it off the filter element 32 and into a hopper.

Figure 2:
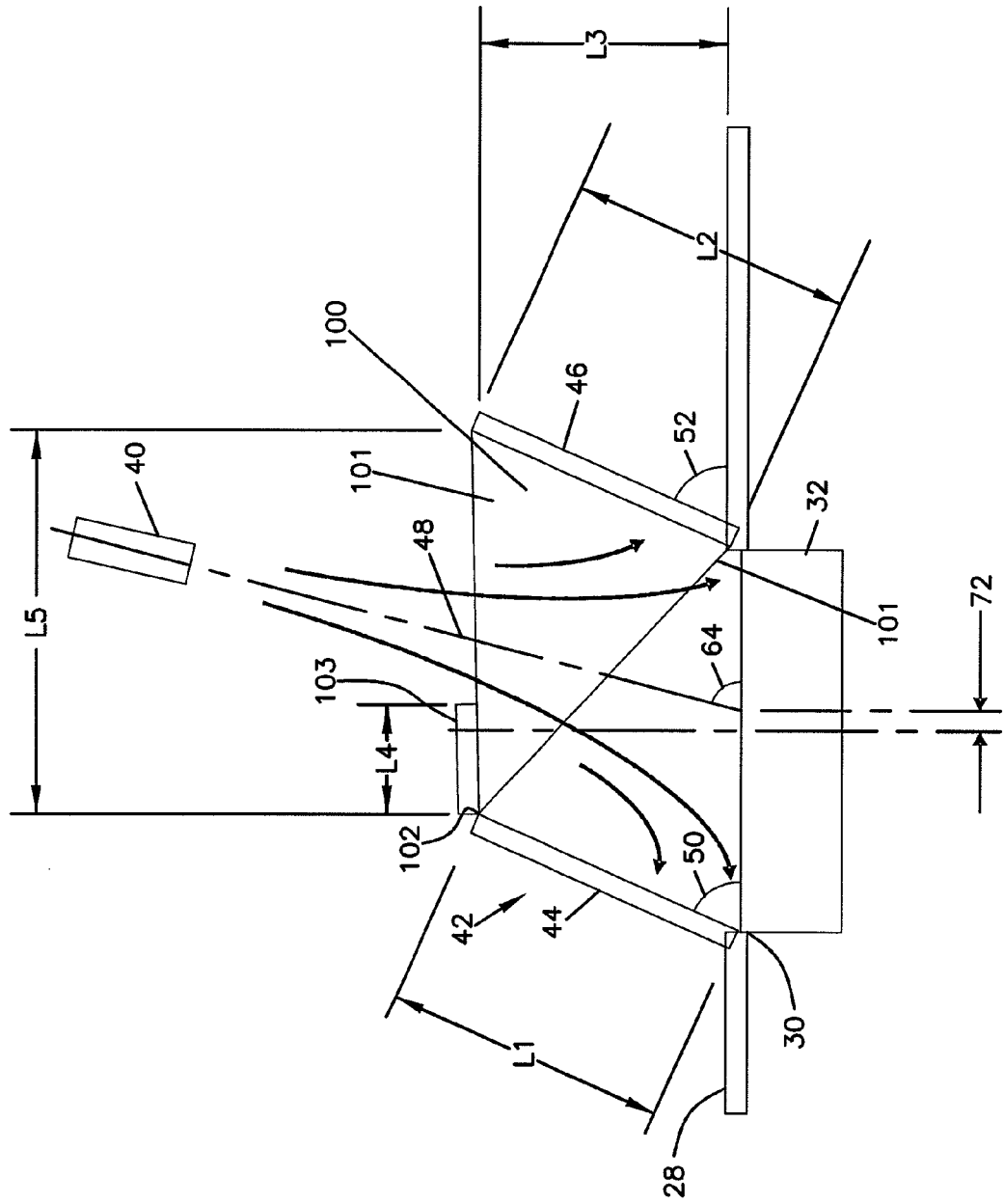
FIG. 2 is a schematic side elevational view illustrating principles of this disclosure.

A schematic illustration of the portion of the system 10 is illustrated in FIG. 2. In FIG. 2, the blow pipe 40 can be seen oriented with respect one the filter elements 32 in the opening 30 in the tubesheet 28. In FIG. 2, it can be seen how the blow pipe 40 is oriented relative to the filter element 32 in a plane 60 (FIG. 3) that contains the respective opening 30 in the tubesheet 28 for the respective filter element 32, such that a pulse that comes from the blow pipe 40 is at an angle that is not normal to a plane of the opening 30 and is not in line with a general direction of filtration flow through the filter element 32. By the term "not normal", it is meant non-orthogonal, such as at an acute or obtuse angle relative to the plane 60 that contains the opening 30 for the respective filter element 32. By "not in line with a general direction of filtration flow", it is meant, for a straight-through flow filter, the pulse flow is in a direction that is not parallel to the flow of direction through the filter element 32. By directing the fluid pulse at the filter element 32 at such an angle 64, the exhaust jet, which expands at a predictable angle, creates a diameter D2 (FIG. 3) larger in one direction that a diameter D1 that is typically used in the prior art.

While the illustrated embodiment shows only a single blowpipe 40 corresponding to a single filter element 32, it should be understood that in many implementations, there are more than one blowpipe 40 for each element 32.

In a preferred embodiment, at least a portion of the pulse is trapped by using an accumulator arrangement 42. The accumulator arrangement 42 captures the flow of the pulse from the blow pipe 40. In one embodiment, the accumulator arrangement 42 includes a least one plate, shown as first plate 44, oriented on the clean air side 15 of the tubesheet 28 and adjacent to the opening 30 of the tubesheet 28. The first plate 44 may be any type of wall, sheet metal, panel, baffle, rigid plastic, or generally non-porous solid structure that is oriented to the adjacent respective opening in the tubesheet 28 for the respective filter element 32.

In certain implementations, the accumulator arrangement includes a second plate 46 oriented at an opposite end of the opening 30 at the tubesheet 28 from the first plate 44. In the embodiment shown, the first and second plates 44, 46 are aligned with the general direction of the pulse, but the angle does not necessarily need to be the same as the angle of the pulse direction. FIG. 2 illustrates a center line of the direction of the pulse at 48. The first plate is mounted at a first angle 50 relative to the tubesheet 28. The first angle is within about 85° of center line 48 of a direction of the pulse. Similarly, the second plate 46 is mounted at a second angle 52 relative to the tubesheet 28. The second angle 52 is within about 85° of the center line 48 of a direction of the pulse. In some embodiments, the first angle 50 and the second angle 52 are equal. In other embodiments, the first angle 50, and second angle 52 are unequal. In some embodiments, the first angle 50 and the second angle 52 are within 85° of being parallel to each other. The angles 50, 52 of the plates 44, 46 are selected based upon the angle 53 of the pulse. If the angles are too small (such as under about 15° from being parallel to the centerline 48) then the problem is pressure loss associated with primary flow.

In certain implementations, the accumulator arrangement includes a third and a fourth plate 100 oriented at the sides of the opening 30 at the tubesheet 28 between the first plate 44 and second plate 46. The third and fourth plates 100 are aligned generally normal to the tubesheet 28, but the angle does not necessarily need to be 90°. The height $L_3$ of plate 100, shown at 101, can range from 0.00 inch to equal to the length $L_2$ of plate 46. The height of plate 100 at location 102 can range from $0.125 \times L_1$ to $1.50 \times L_1$, preferably $1.00 \times L_1$.

In certain applications, the accumulator arrangement includes a fifth plate 103. The length $L_4$ of this plate can range from $0.25 \times L_5$ to $1.0 \times L_5$, preferably $0.25 \times L_5$. The location of plate 103 at position 102 can range from $0.25 \times L_1$ to $1.0 \times L_1$, preferably $1.0 \times L_1$. The angle of plate 103 in relation to the tubesheet 28 can range from +45° to −45°, preferably parallel or 0°.

In certain applications, plates 44, 46, 100, 103 will be curved. The curved portion can be located at one or both ends or may encompass the entire length $L_1$, $L_2$, $L_3$, $L_4$, of the plates 44, 46, 100, 103.

As illustrated in FIG. 2, the first plate 44 has length $L_1$ which is preferably no longer than 3 times the length of the respective opening 30 in the tubesheet 28. This is because primary flow pressure loss increases with increase in length. Preferably, the length $L_1$ has a length that is between 25-75% of a length of the respective opening 30 in the tubesheet 28. In preferred arrangements, the blow pipe 40 is spaced no more than 30-40 times of an inside diameter of the blowpipe from the tubesheet to eject the pulse.

In FIG. 2, reference numeral 72 shows the offset between the pulse center line 48 and a center of the filter element 32. This shows how the center line 48 of the pulse is not always in alignment with the center of the filter element 32.

In one embodiment, the plate that is closer to the respective blow pipe 40 (in the embodiment illustrated, the second plate 46) has a length that is shorter than the other plate (in this example, the first plate 44). In one embodiment, this shorter plate 46 has a length that is not less than 5% of a length of the respective opening 30 in the tubesheet 28. This arrangement is advantageous because of both material savings and pressure loss associated with pumping air flow.

Figure 3:
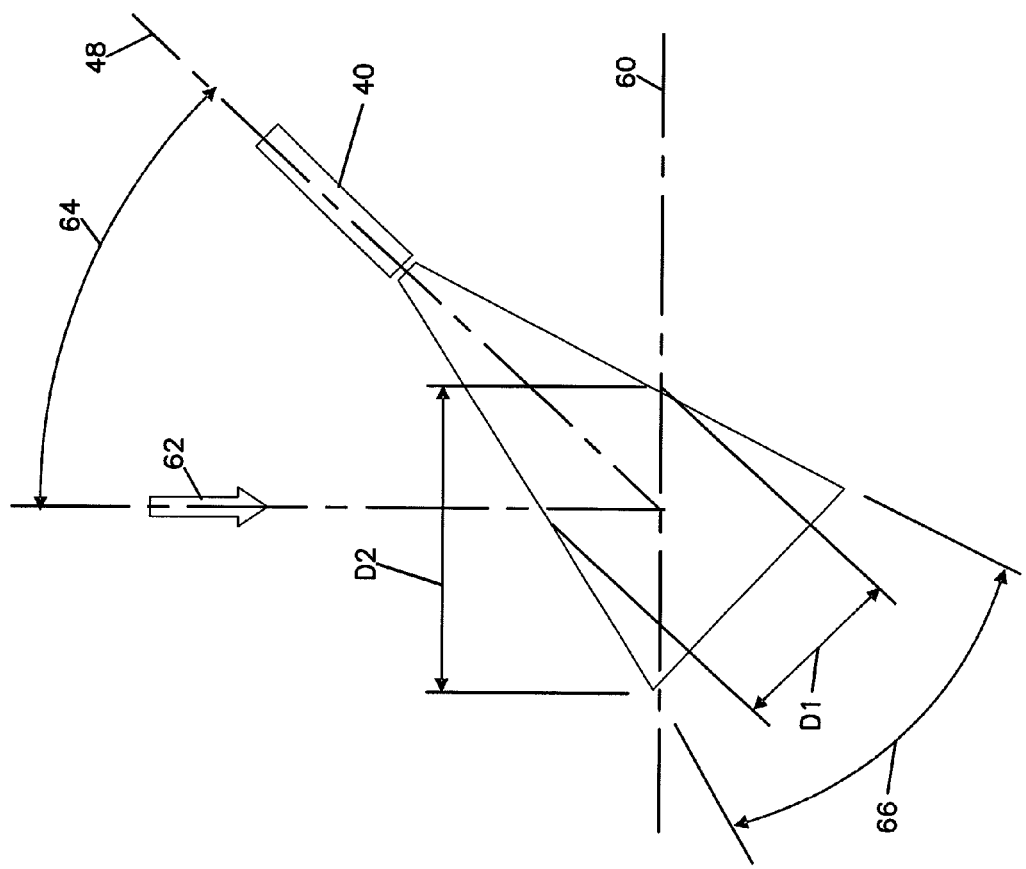
FIG. 3 is a schematic diagram illustrating principles of this disclosure.
Figure 4:
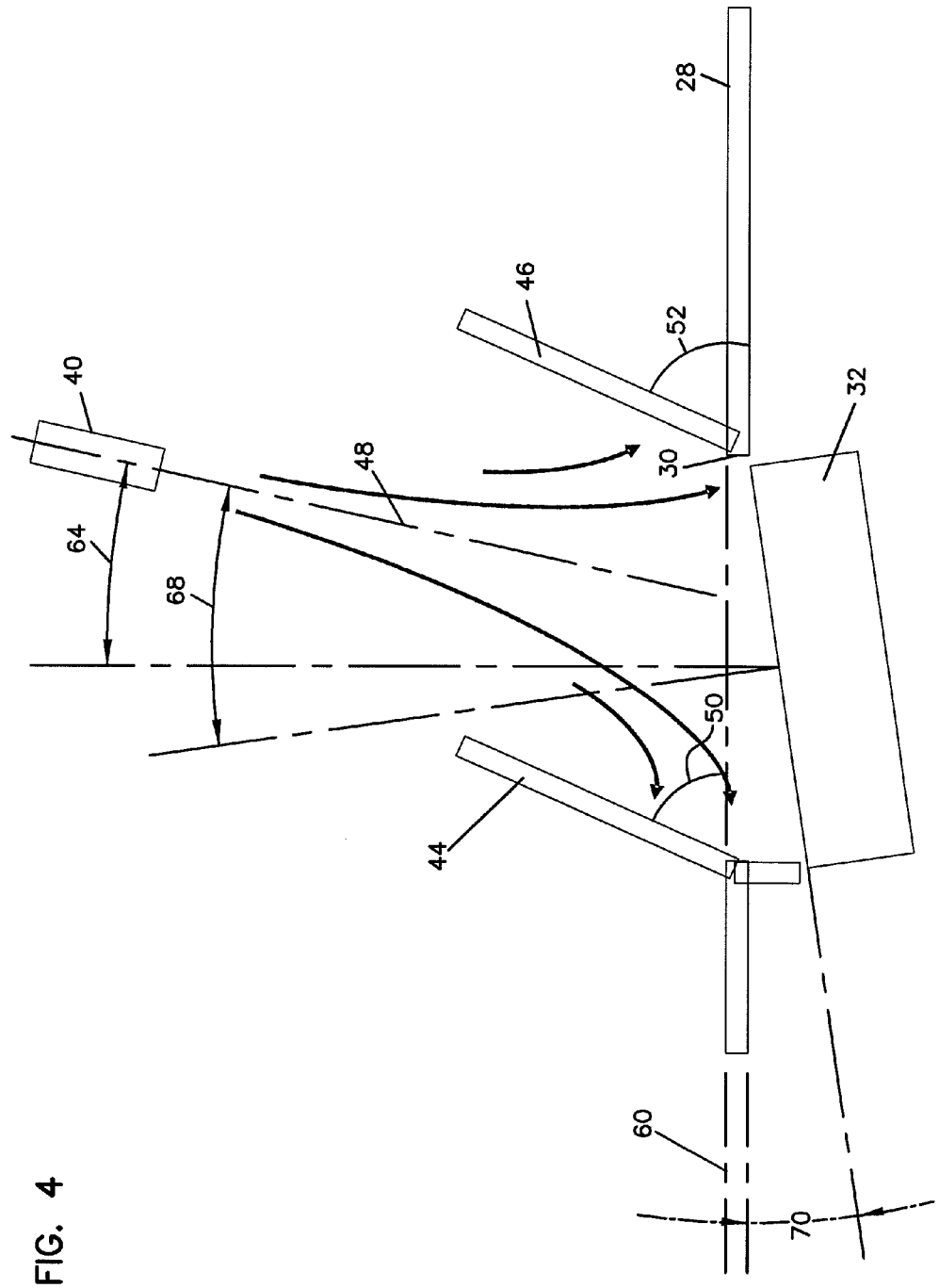
FIG. 4 is a schematic diagram illustrating principles of this disclosure.

Attention is directed to FIG. 3. In FIG. 3, the arrow 62 represents the prior art pulse direction. In the prior art, the standard pulse direction is directed perpendicular or normal to the plane 60 that contains the tubesheet 28. Angle 64 shows the angle that is offset to the vertical direction, or the direction from the standard, prior art direction shown by arrow 62. A typical pulse expansion is shown at angle 66, from the blow pipe 40. As explained above, the exhaust jet from the blow pipe 40 creates a diameter D2, covering a larger surface area in the opening 30 of tubesheet 28, versus diameter D1 that comes from the exhaust jet shown at arrow 62 in the prior art arrangement. In FIG. 4, an alternative arrangement of the filter element 32 relative to the tubesheet 28 is shown. In the FIG. 4 embodiment, the filter element 32 is offset at an angle 70 relative to the tubesheet opening 30. This arrangement results in an angle 68 of the pulse direction 48 greater at the face of the filter 36 than the angle 68 of the pulse direction 48 at the plane 60 of the tubesheet opening 30.

One useful arrangement has the following angles and dimensions: Angle 68 is 55°-65°, preferably 61°; angles 50 and 52 are equal and 65°-72°, preferably 67°-68°; first and second plates 44, 46 are parallel; offset 72 is about 3 inches; length L1 is about 8-16 inches, preferably about 12 inches; and length $L_2$ is about 6-10 inches, preferably about 8.0 inches. The blowpipe is spaced no more than 30-40 times of an inside diameter of the blowpipe from the tubesheet to eject the pulse.

Figure 5:
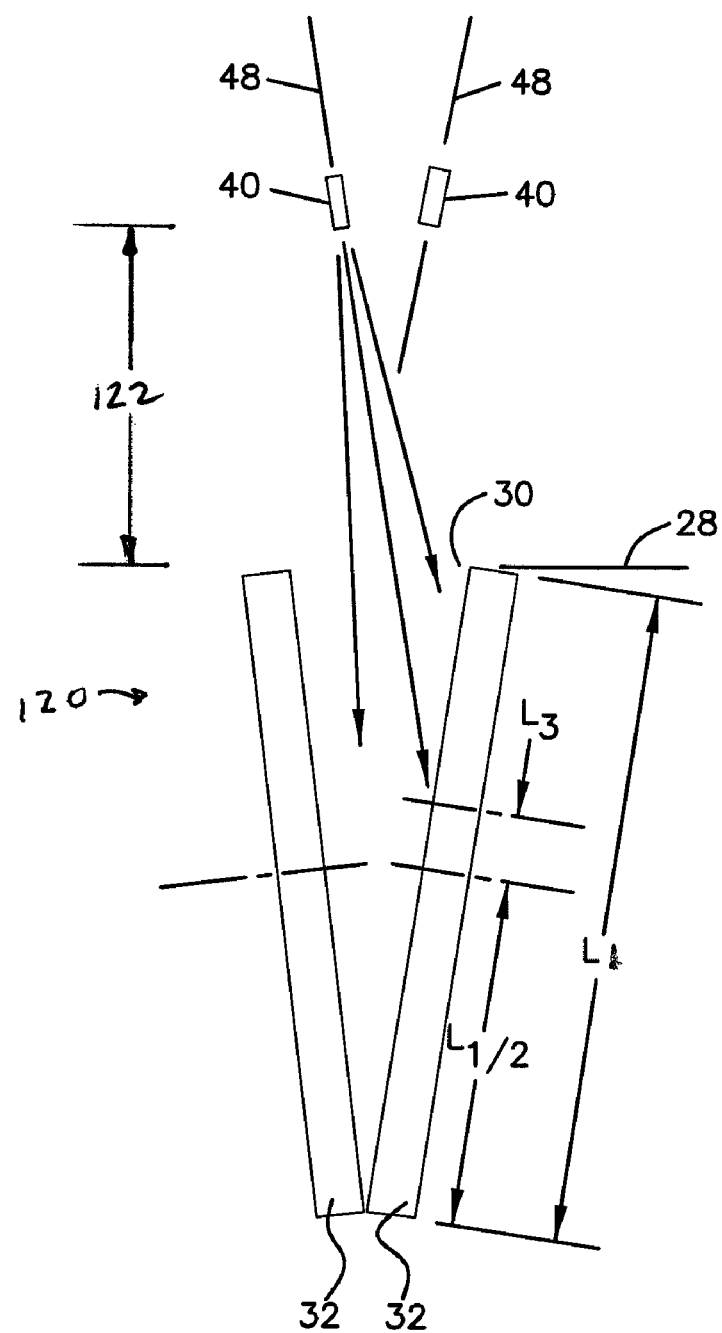
FIG. 5 is a schematic diagram illustrating principles of this disclosure on either a V-pack filter or a conical filter.

FIG. 5 illustrates principles of this disclosure by pulse-cleaning a V-pack filter arrangement 120. The V-pack filter arrangement 120 includes first and second filter elements 32 arranged together in the form of a V. Air to be cleaned flows through the filter elements 32 into the interior of the V. When the filter elements 32 are to be cleaned, pulses are ejected from blowpipes 40. In the embodiment shown, there is one blow pipe 40 oriented at a first of the filter elements 32, and another blowpipe 40 oriented at a second of the filter elements 32. Again, in accordance with principles of this disclosure, the pulse that comes from each blowpipe 40 is at an angle that is not normal to a plane of the opening 30 and is not in line with a general direction of filtration flow through each filter element 32. Each pulse hits about a distance $L_3$, which is spaced from a point half of the overall distance $L_1$ of each filter element 32. Each of the blowpipes 40 is spaced a distance 122 from an end point of the filter elements 32 which is about 10-40 times the diameter of each blowpipe 40. While a V-pack filter arrangement 120 is shown, the arrangement of FIG. 5 can also represent a conical-shaped filter element, in which the side wall of the filter element is shaped in the form of a cone truncated cone.

Figure 6:
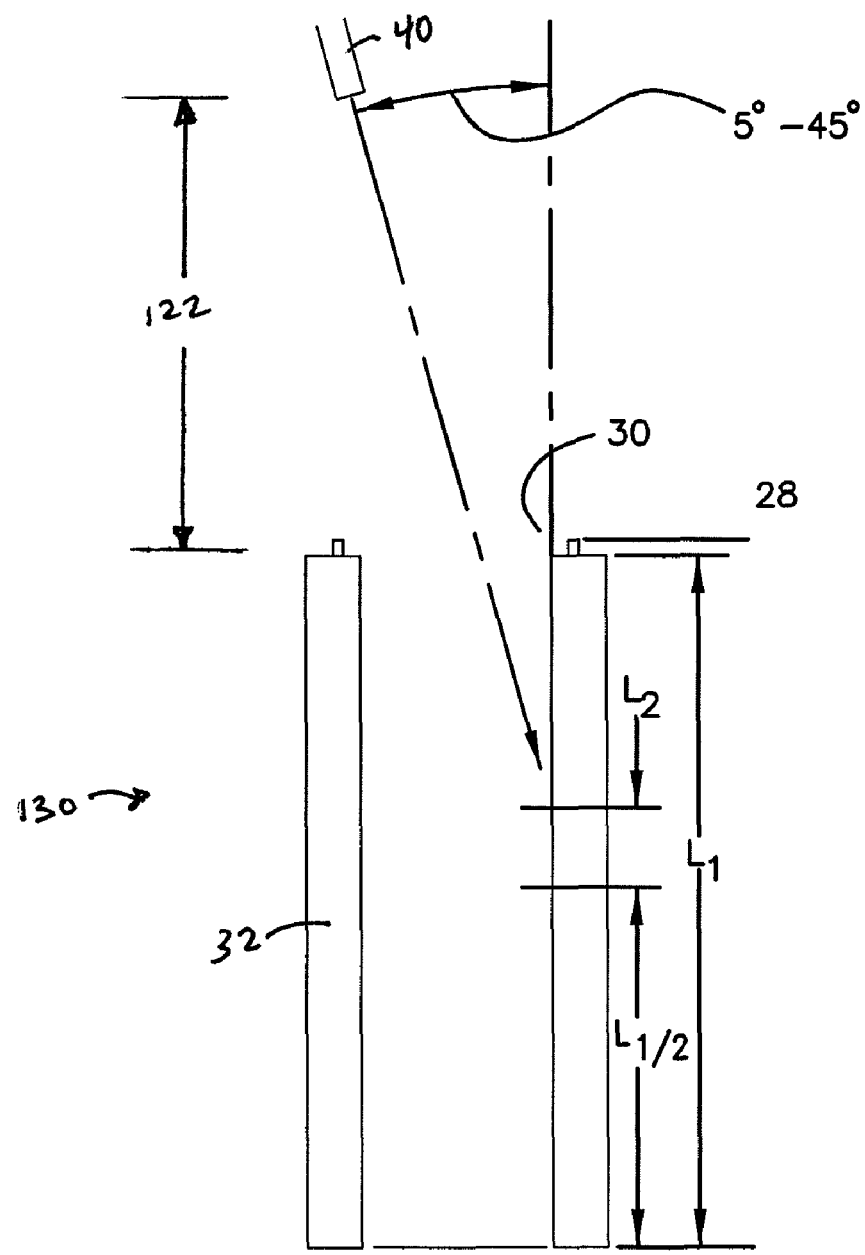
FIG. 6 is a schematic diagram illustrating principles of this disclosure on cylindrical filter.

In FIG. 6, a cylindrical filter arrangement 130 is schematically-illustrated as being pulsed in accordance with principles of this disclosure. The filter element 32 is embodied as a cylindrical element having a circular cross-section. The element 32 is pulse cleaned as described above. In particular, it can be seen how the blowpipe 40 is oriented relative to the filter element 32 such that a pulse that comes from the blowpipe 40 is at an angle that is not normal to a plane of the opening 30 and is not in line with a general direction of filtration flow through the filter element 32. The blowpipe 40 is illustrated as being at an angle of 5°-45° relative to the cylindrical wall 32 of the filter arrangement 130. The pulse impacts the filter element 32 at approximately the point $L_2$, which is spaced from a point that is half of the overall distance $L_1$ of the length of the filter element 32. The cylindrical element 32 can also be pulsed with a plurality of blowpipes 40. The blowpipe 40 is spaced a distance 122 from the end of the filter element 32 which is about 10-40 times the diameter of the blowpipe 40.

FIGS. 7A and 7B each illustrate multiple filters stacked axially relative to each other. In FIG. 7A, there are two cylindrical filter elements 32 arranged axially end-to-end. In FIG. 7B, a conical element is shown stacked or aligned axially next to a cylindrical element. In each case, the filter elements 32 are pulse cleaned, in that the blowpipe 40 is oriented relative to the filter element 32 in a plane that contains the respective opening 30 in tubesheet 28 for the respective filter elements 32, such that a pulse that comes from the blowpipe 40 is at an angle that is not normal to a plane of the opening 30 and is not in line with a general direction of filtration flow of the filter element 32. As described above, distance 122 is about 10-40 times the diameter of the blowpipe 40 between the tubesheet 28 and the blowpipe 40.

Figure 8:
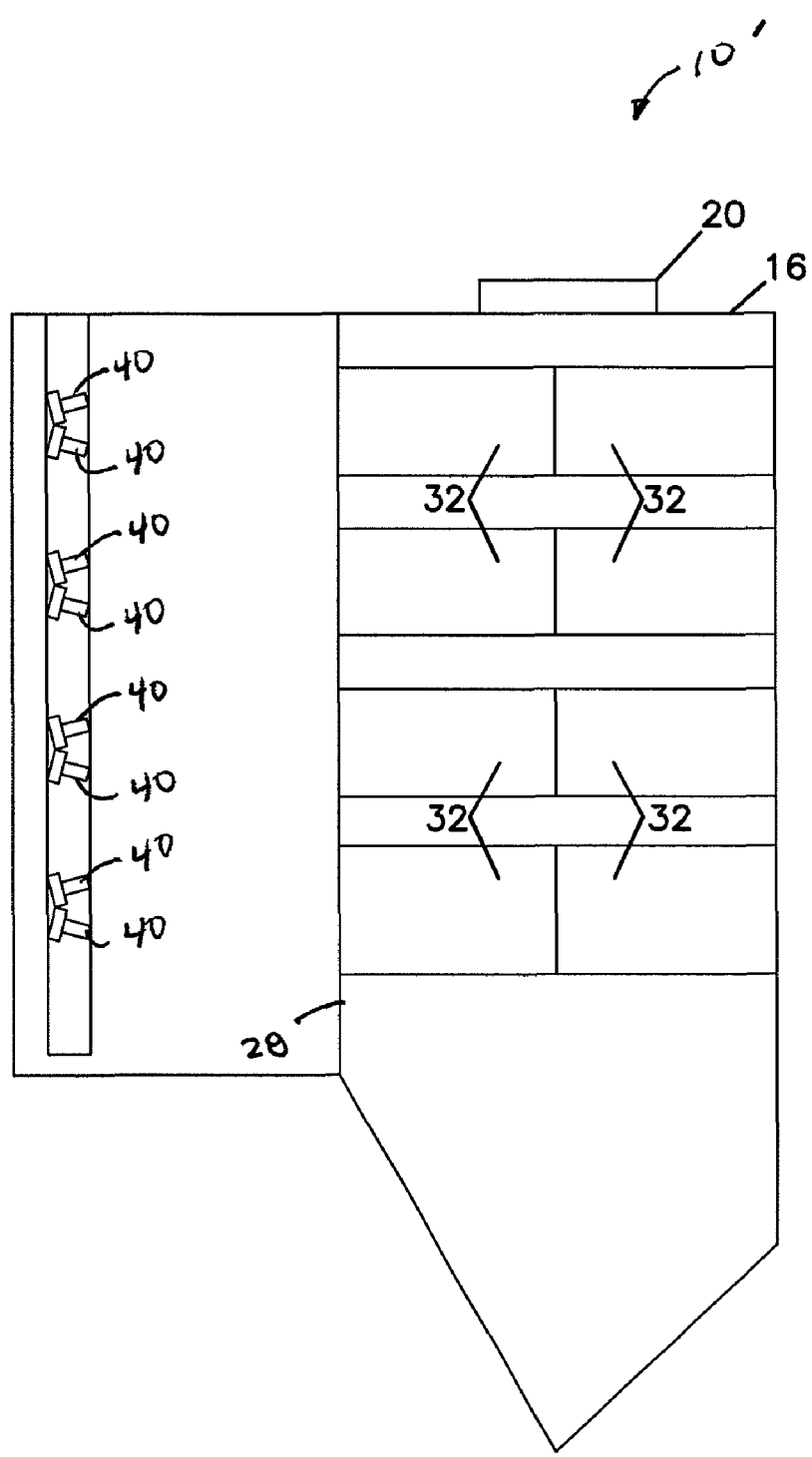
FIG. 8 is a schematic diagram illustrating principles of this disclosure including having more than one blowpipe pulse cleaning a filter arrangement.

FIG. 8 shows a schematic diagram of a modified system 10', which illustrates a dust filter using a method of pulse cleaning filter media by directing a fluid pulse at the filter media that exhausts from more than one blowpipe 40. In the embodiment shown, cylindrical filter elements 32 are shown in a stacked configuration, such as the embodiment of FIG. 7A. As described above, the filter media can be embodied in other forms such as a panel, a conical element, a V-pack element, or combinations. In the embodiment shown, there are two blowpipes 40 directed at each filter element arrangement 32. The blowpipes 40 are oriented as described above, such that the fluid pulses are at an angle that is not normal to a plane of the opening of the tubesheet 28 and also not in line with a general direction of filtration flow through the filter media 32.

What is claimed:
1. An air cleaner comprising:
(a) a housing including a dirty air inlet, a clean air outlet, and an interior;
(b) a planar tubesheet in the housing interior having a plurality of openings in the same plane as the tubesheet;
(c) a plurality of panel-style filters, each filter being mounted in a respective one of the openings in the tubesheet and having a flow face generally parallel to the plane of the tubesheet; each of the filters being mounted in the respective one of the openings to permit air to flow through the flow faces in a straight flow through direction; and
(d) a plurality of blowpipes mounted to the housing and spaced from the panel style filters; each blowpipe being oriented to direct a centerline of a fluid pulse at a respective one of the filters at an angle that is:
(i) not normal to the plane of the openings in the tubesheet; and
(ii) not in line with the direction of filtration flow through the respective filters; and
(e) wherein the blowpipes are spaced no more than 10-40 times of an inside diameter of the blowpipe from the tubesheet.
2. The air cleaner of claim 1 wherein:
(a) the tubesheet is vertically oriented; and
(b) the blowpipes are mounted to the housing at an angle in an upward direction relative to the vertical direction of the tubesheet.
3. The air cleaner of claim 1 wherein:
(a) the panel style filter includes media of one of Z-media, pleated media, depth media, HEPA media, or mini V-pack media.
4. The air cleaner of claim 1 further comprising:
(a) an accumulator arrangement oriented adjacent to the openings in the tubesheet on a downstream side of the tubesheet.
5. The air cleaner of claim 4 wherein:
(a) the accumulator arrangement includes a plurality of plates oriented adjacent to the openings in the tubesheet.
6. The air cleaner of claim 4 wherein:
(a) the accumulator arrangement includes, for each opening in the tubesheet, a first and second plate adjacent to opposite ends of the tubesheet opening.
7. The air cleaner of claim 6 wherein:
(a) the first plate is mounted at a first angle relative to the tubesheet, the first angle being within about 85° of a center line of a direction of the pulse; and
(b) the second plate is mounted at a second angle relative to the tubesheet, the second angle being within about 85° of a center line of a direction of the pulse.
8. The air cleaner of claim 4 wherein:
(a) a total length of the first plate and second plate added together is no longer than twice of a length of the respective opening in the tubesheet.
9. The air cleaner of claim 4 wherein:
(a) a length of the first plate about 300% of a length of the respective opening in the tubesheet.
10. The air cleaner of claim 4 wherein:
(a) the panel style filter includes media of one of Z-media, pleated media, depth media, HEPA media, or mini V-pack media.

* * * * *